United States Patent
Amaya et al.

(10) Patent No.: US 12,542,459 B2
(45) Date of Patent: Feb. 3, 2026

(54) ELECTRIC MOTOR

(71) Applicant: Panasonic Intellectual Property Management Co., Ltd., Osaka (JP)

(72) Inventors: Takanori Amaya, Osaka (JP); Yasuo Nanbu, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 368 days.

(21) Appl. No.: 18/004,624

(22) PCT Filed: Jun. 30, 2021

(86) PCT No.: PCT/JP2021/024801
§ 371 (c)(1),
(2) Date: Jan. 6, 2023

(87) PCT Pub. No.: WO2022/019074
PCT Pub. Date: Jan. 27, 2022

(65) Prior Publication Data
US 2023/0253838 A1    Aug. 10, 2023

(30) Foreign Application Priority Data
Jul. 22, 2020    (JP) ................................. 2020-125369

(51) Int. Cl.
*H02K 1/27*    (2022.01)
*H02K 1/02*    (2006.01)
(Continued)

(52) U.S. Cl.
CPC ................. *H02K 1/02* (2013.01); *H02K 1/04* (2013.01); *H02K 1/276* (2013.01); *H02K 7/083* (2013.01);
(Continued)

(58) Field of Classification Search
CPC ........... H02K 1/02; H02K 1/04; H02K 1/276; H02K 7/083; H02K 21/16; H02K 2213/03;
(Continued)

(56) References Cited

U.S. PATENT DOCUMENTS

| 2011/0050022 | A1 | 3/2011 | Li et al. | |
| 2013/0119806 | A1* | 5/2013 | Watanabe | H02K 1/27 310/156.01 |

(Continued)

FOREIGN PATENT DOCUMENTS

| JP | 5186899 B | 4/2013 |
| JP | 2015-223079 | 12/2015 |

(Continued)

OTHER PUBLICATIONS

International Search Report of PCT application No. PCT/JP2021/024801 dated Aug. 10, 2021.
(Continued)

*Primary Examiner* — Thomas Truong
(74) *Attorney, Agent, or Firm* — Rimon P.C.

(57) ABSTRACT

An electric motor includes a rotor having an iron core to which a rotary shaft extending in a shaft center direction is fixed, and a stator disposed to face the rotor. The stator includes a plurality of teeth extending to the rotor, and a slot positioned between adjacent teeth among the plurality of teeth. The iron core includes a plurality of magnet insertion holes and a plurality of permanent magnets disposed in the plurality of magnet insertion holes, respectively, and the plurality of permanent magnets are rare earth magnets. An outermost peripheral shape of the iron core corresponding to a magnetic pole of each of the plurality of permanent magnets includes a plurality of arcs having different radii, the number of poles of the rotor is greater than or equal to (Continued)

10, and a residual magnetic flux density of the permanent magnet is greater than or equal to 1.3T.

8 Claims, 4 Drawing Sheets

(51) Int. Cl.
  *H02K 1/04* (2006.01)
  *H02K 1/276* (2022.01)
  *H02K 7/08* (2006.01)
  *H02K 21/16* (2006.01)
  *F24F 1/20* (2011.01)
(52) U.S. Cl.
  CPC ............... *H02K 21/16* (2013.01); *F24F 1/20* (2013.01); *H02K 2213/03* (2013.01)
(58) Field of Classification Search
  CPC .......... H02K 5/02; H02K 29/03; H02K 9/227; H02K 2201/03; F24F 1/20
  See application file for complete search history.

(56) References Cited

U.S. PATENT DOCUMENTS

| | | | |
|---|---|---|---|
| 2013/0119811 A1 | 5/2013 | Kobayashi | |
| 2013/0270961 A1 | 10/2013 | Chu | |
| 2014/0145547 A1 | 5/2014 | Nakano et al. | |
| 2014/0368081 A1 | 12/2014 | Yabe et al. | |
| 2020/0021224 A1* | 1/2020 | Nigo | H02P 25/184 |
| 2021/0296951 A1* | 9/2021 | Nishijima | H02K 1/276 |
| 2022/0037942 A1* | 2/2022 | Okazaki | H02K 1/276 |
| 2023/0243360 A1* | 8/2023 | Shimokawa | F04D 25/0646 |
| | | | 417/354 |

FOREIGN PATENT DOCUMENTS

| | | |
|---|---|---|
| JP | 2016-195490 A | 11/2016 |
| JP | 2019-208347 A | 12/2019 |
| WO | 2013/054439 | 4/2013 |
| WO | 2020/110191 A1 | 6/2020 |

OTHER PUBLICATIONS

The EPC Office Action dated Dec. 6, 2023 for the related European Patent Application No. 21845185.4.
The EPC Office Action dated Dec. 4, 2025 for the related European Patent Application No. 21845185.4.

* cited by examiner

ELECTRIC MOTOR

TECHNICAL FIELD

The present disclosure relates to an electric motor, and particularly to an electric motor including a permanent magnet-embedded rotor in which a permanent magnet is embedded in an iron core.

BACKGROUND ART

Electric motors are used in various electric devices such as household devices or industrial devices. For example, a fan motor in which a rotating fan is attached to a rotary shaft has been known as an electric motor used for an air conditioning unit, a vacuum cleaner, or the like. The fan motor in the air conditioning unit is mounted on, for example, an outdoor unit. As this type of electric motor, PTL 1 discloses a brushless motor for driving a fan.

In the related art, as an electric motor, an interior permanent magnet (IPM) motor having a permanent magnet-embedded rotor in which a plurality of permanent magnets are embedded in an iron core has been known. The IPM motor can acquire not only magnet torque generated by the permanent magnets, but also reluctance torque due to uneven magnitude of magnetic resistance generated in the iron core. Thus, a motor having a small size and high efficiency is realized.

In the related art, a technology using a rare earth magnet having a high energy density as a permanent magnet of an IPM motor has been known. In this case, a rare earth magnet made of neodymium, iron, and boron (Nd—Fe—B) is generally used.

However, in the fan motor equipped with the IPM motor using the rare earth magnet in the related art, in order to suppress vibration and noise while high output and high efficiency are maintained, the number of poles of the rotor needs to be limited to be less than or equal to 8, or a rare earth magnet (for example, Br<1.3 T) having a low residual magnetic flux density (Br) needs to be used.

CITATION LIST

Patent Literature

PTL 1: Japanese Patent No. 5186899

SUMMARY OF THE INVENTION

The present disclosure has been made to solve such a problem, and an object of the present disclosure is to provide an electric motor that can achieve both suppression of vibration and noise and an increase in high output and high efficiency even in an IPM motor using a rare earth magnet.

In order to achieve the above object, an aspect of an electric motor according to the present disclosure includes a rotor that has an iron core to which a rotary shaft extending in a shaft center direction is fixed, and a stator that is disposed to face the rotor. The stator includes a plurality of teeth extending to the rotor, and a slot positioned between adjacent teeth among the plurality of teeth. The iron core includes a plurality of magnet insertion holes and a plurality of permanent magnets disposed in the plurality of magnet insertion holes, respectively. The plurality of permanent magnets are rare earth magnets, an outermost peripheral shape of the iron core corresponding to a magnetic pole of each of the plurality of permanent magnets includes a plurality of arcs having different radii, the number of poles of the rotor is greater than or equal to 10, and a residual magnetic flux density of the permanent magnet is greater than or equal to 1.3 T.

Further, the number of poles of the rotor is 10, and the number of slots of the stator is preferably 12.

Further, the residual magnetic flux density of the permanent magnet is preferably greater than or equal to 1.4 T.

The electric motor may further include a molded resin that covers the stator.

Further, the molded resin may have a main body that covers the stator and a protrusion that protrudes outward from a side surface of the main body.

Further, dysprosium may not be contained in the rare earth magnet.

Further, the electric motor may further include a bearing that rotatably supports the rotary shaft. A dielectric material may be provided between the rotary shaft and an outer peripheral surface of the iron core.

According to the present disclosure, in the IPM motor using the rare earth magnet, it is possible to achieve both the suppression of the vibration and noise, and the high output and high efficiency.

DESCRIPTION OF EMBODIMENT

Hereinafter, an exemplary embodiment of the present disclosure is described. Note that the exemplary embodiment described below shows a specific example of the present disclosure. Therefore, numerical values, constituent elements, disposed positions and connection modes of the constituent elements, and steps, order of the steps, and the like shown in the following exemplary embodiment are merely examples, and are not intended to limit the present disclosure. Thus, among the constituent elements in the following exemplary embodiment, constituent elements that are not described in independent claims indicating the highest concept of the present disclosure are described as optional constituent elements.

Each of the drawings is a schematic view and is not necessarily exactly illustrated. Note that, in each drawing, substantially the same components are denoted by the same reference marks, and redundant description will be omitted or simplified.

In the present exemplary embodiment, a radial direction of stator 10 and rotor 20 is referred to as a "radial direction", and a rotation direction of rotor 20 is referred to as a "circumferential direction". That is, a direction extending from shaft center C of rotary shaft 21, with shaft center C as a center, is a "radial direction", and a direction around shaft center C of rotary shaft 21, with shaft center C as a center, is a "circumferential direction". Therefore, the "radial direction" is a direction orthogonal to a direction of shaft center C of rotary shaft 21. Rotor 20 rotates around shaft center C of rotary shaft 21 as a rotation center.

Exemplary Embodiment

Figure 1:
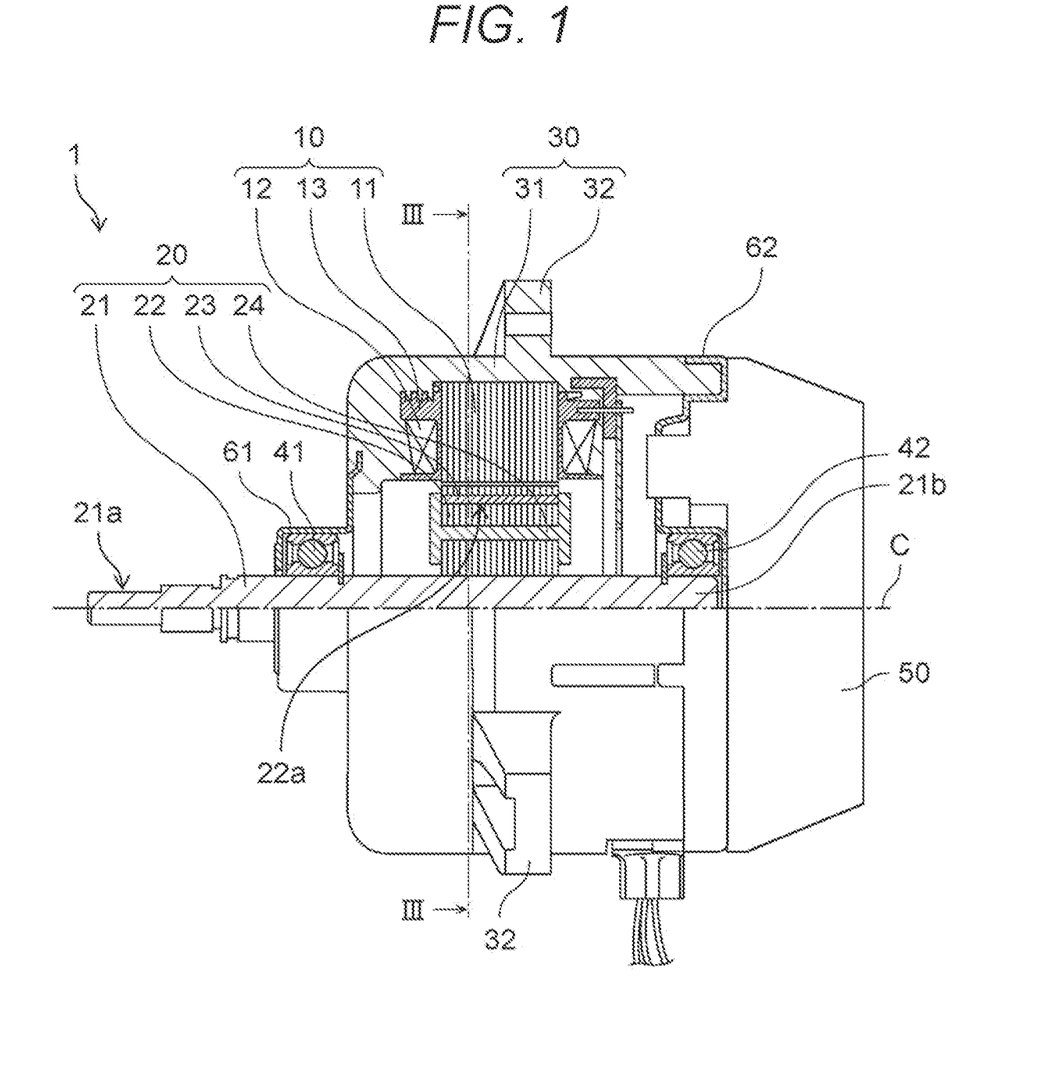
FIG. 1 is a cross-sectional view of an electric motor according to an exemplary embodiment.
Figure 2:
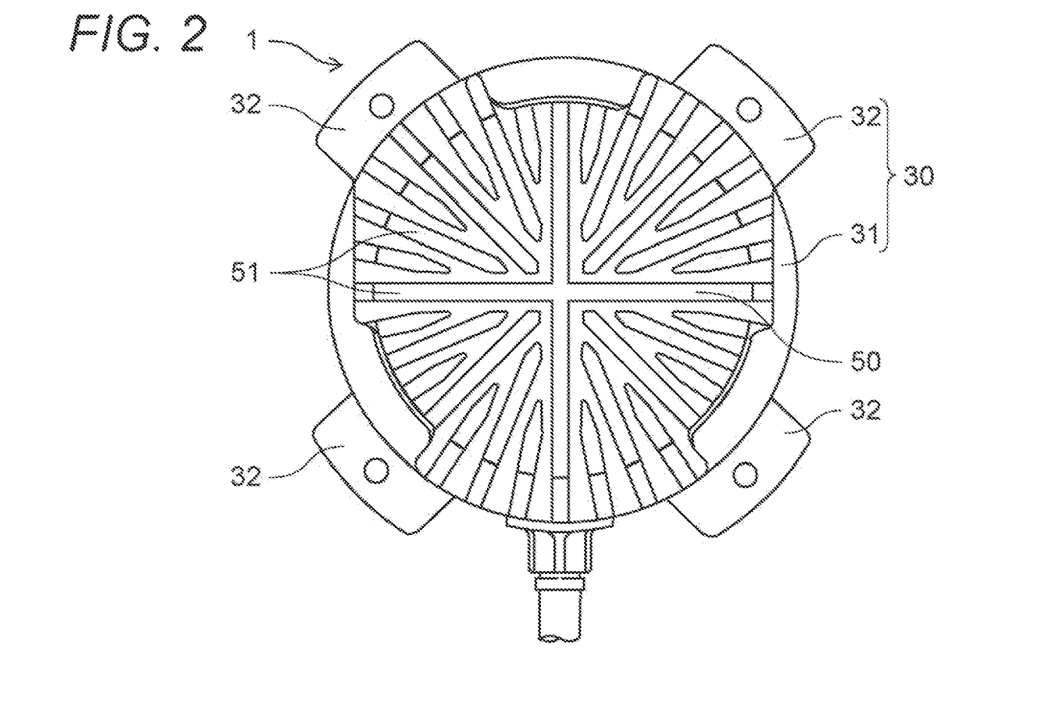
FIG. 2 is a plan view of the electric motor according to the exemplary embodiment as viewed from an opposite output shaft side.
Figure 3:
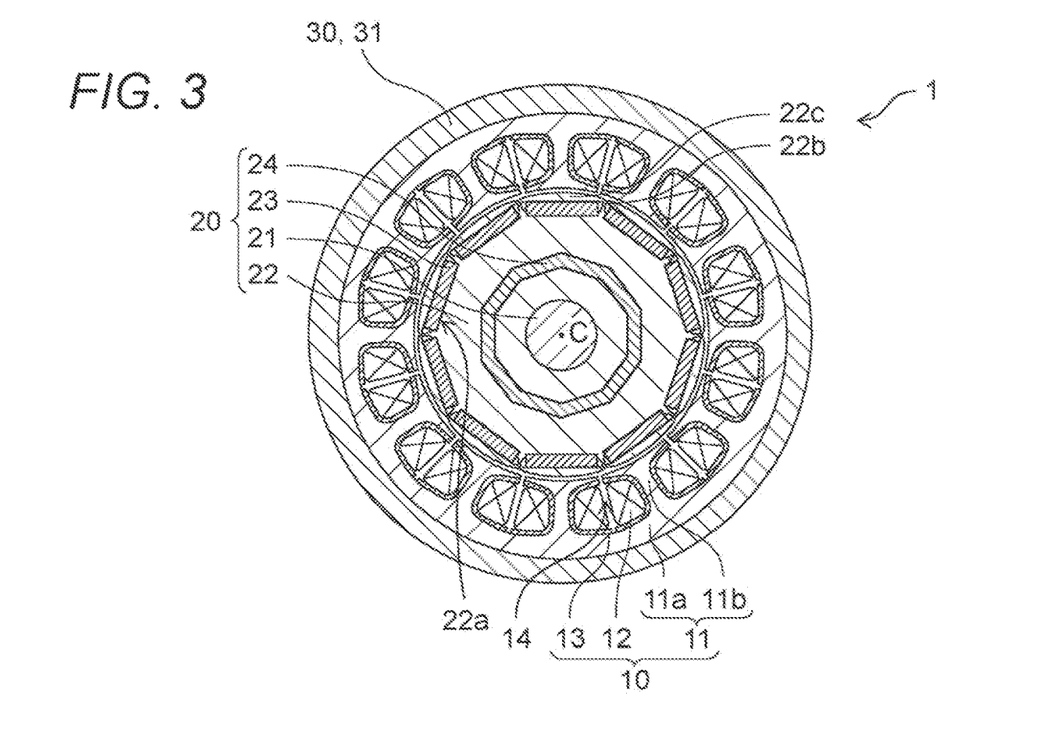
FIG. 3 is a cross-sectional view taken along line in FIG. 1.

First, a configuration of electric motor 1 according to the exemplary embodiment will be described with reference to FIGS. 1 to 3. FIG. 1 is a cross-sectional view of electric motor 1 according to the exemplary embodiment. FIG. 2 is a plan view of electric motor 1 as viewed from an opposite output shaft side. FIG. 3 is a cross-sectional view taken along line III-III in FIG. 1.

As illustrated in FIGS. 1 to 3, electric motor 1 includes stator 10, rotor 20 disposed to face stator 10, and molded resin 30 covering stator 10. In the present exemplary embodiment, the number of poles (the number of magnetic poles) of rotor 20 is 10. The number of slots 14 of stator 10 is 12. Note that, when the number of poles (the number of magnetic poles) of rotor 20 is greater than or equal to 10, a similar effect can be expected.

Electric motor 1 further includes first bearing 41, second bearing 42, heat sink 50, first bracket 61, and second bracket 62.

Note that, electric motor 1 according to the present exemplary embodiment is a molded motor in which stator 10 is covered with molded resin 30. Further, electric motor 1 is a brushless motor that does not use a motor brush.

As illustrated in FIGS. 1 and 3, stator 10 (stator) is disposed to face rotor 20 via a minute air gap with rotor 20. Specifically, stator 10 is disposed to surround iron core 22 of rotor 20. That is, electric motor 1 is an inner rotor type motor in which rotor 20 is disposed inside stator 10.

Stator 10 generates a magnetic force acting on rotor 20. Specifically, stator 10 includes multiple N poles and S poles that are alternately and repeatedly provided to generate a magnetic flux on surfaces of the stator and iron core 22 of rotor 20, the surfaces being located across the air gap therebetween. Stator 10 constitutes a magnetic circuit together with rotor 20.

Stator 10 includes iron core 11, winding 12, and insulator 13.

Iron core 11 of stator 10 is a stator iron core (stator core) having an annular shape serving as a core of stator 10, and generates a magnetic force for rotating rotor 20. As illustrated in FIG. 1, iron core 11 is, for example, a stacked body in which multiple steel sheets are stacked in a direction of shaft center C of rotary shaft 21 of rotor 20. Each of the multiple steel sheets is a punched electromagnetic steel sheet formed in a predetermined shape, for example. Iron core 11 is not limited to the stacked body of the multiple steel sheets, and may be a bulk body made of a magnetic material.

As illustrated in FIG. 3, iron core 11 includes yoke 11a formed in an annular shape to surround iron core 22 of rotor 20, and a plurality of teeth 11b extending toward rotor 20.

Yoke 11a is a back yoke formed outside each of teeth 11b. Yoke 11a is formed in an annular shape with shaft center C as a center.

The plurality of teeth 11b protrude from yoke 11a toward rotary shaft 21. Specifically, the plurality of teeth 11b radially extend in a direction (radial direction) orthogonal to shaft center C of rotary shaft 21. The plurality of teeth 11b are disposed at equal intervals in the circumferential direction while slot 14 is formed between two adjacent teeth 11b.

That is, slot 14 is positioned between adjacent teeth 11b among the plurality of teeth 11b. Iron core 11 is provided with 12 teeth 11b, and the number of slots 14 is 12. That is, the number of slots of electric motor 1 (stator 10) is 12.

Each of teeth 11b is provided with an extension extending from a leading end on an inner peripheral side of tooth 11b to opposite sides in the circumferential direction. The extension is formed protruding from the leading end on the inner peripheral side of each tooth 11b. An inner peripheral surface positioned at a tip end portion of teeth 11b including the extension is a magnetic pole surface facing an outer peripheral surface of rotor 20. Note that, in two adjacent teeth 11b, there is a gap (slot opening) between the extension of one tooth 11b and the extension of another tooth 11b.

Winding 12 is an armature winding of stator 10. Winding 12 is a winding coil wound around iron core 11 as a stator coil (stator coil).

Winding 12 is wound around each of the plurality of teeth 11b of iron core 11. Specifically, winding 12 is wound around each of the plurality of teeth 11b via insulator 13. That is, a plurality of windings 12 are wound around stator 10. Each winding 12 is a concentrated winding coil wound around one corresponding tooth 11b, and is housed in slot 14 of iron core 11.

Each of the plurality of teeth 11b is a magnetic pole tooth, and generates a magnetic force by energizing winding 12. In the present exemplary embodiment, the plurality of windings 12 in stator 10 are electrically connected as three-phase windings such that rotor 20 rotates as a three-phase synchronous motor. Specifically, the plurality of windings 12 include unit coils of three phases of U-phase, V-phase, and W-phase that are electrically different from each other by 120 degrees. That is, winding 12 attached to each tooth 11b is energized and driven by three-phase alternating current energized in units of phases, which are the U-phase, the V-phase, and the W-phase. As a result, a main magnetic flux of stator 10 is generated in each tooth 11b.

12 windings 12 wound around 12 teeth 11b are divided into four U-phase coils, four V-phase coils, and four W-phase coils in accordance with a phase of a current flowing through each winding 12, and are disposed in predetermined slot 14. Four U-phase coils are electrically connected to be in series connection. Similarly, four V-phase coils and four W-phase coils are also electrically connected in series connection.

Insulator 13 is a coil bobbin and has a frame body in a frame shape around which winding 12 is wound. Specifically, the frame body of insulator 13 is formed surrounding a body of each of teeth 11b. Insulator 13 is provided on each of the plurality of teeth 11b. Each insulator 13 is a resin molding integrally molded with an insulating resin material, for example.

Rotor 20 (rotor) rotates by a magnetic force generated in stator 10. Rotor 20 also generates a magnetic force. Specifically, rotor 20 has a configuration in which multiple N poles and S poles that generate the magnetic flux in the circumferential direction are alternately and repeatedly provided. As a result, rotor 20 generates a magnetic force acting on stator 10. In the present exemplary embodiment, a direction of the magnetic flux generated by rotor 20 is a direction orthogonal to the direction of shaft center C of rotary shaft 21 (shaft center direction). That is, the direction of the magnetic flux by rotor 20 is in the radial direction (radial direction).

Rotor 20 includes rotary shaft 21, iron core 22, a plurality of permanent magnets 23, and dielectric material 24. Rotor 20 rotates around shaft center C of rotary shaft 21 as a rotation center. That is, rotary shaft 21 serves as the center of rotation of rotor 20.

Rotor 20 is a permanent magnet embedded rotor (IPM rotor) in which permanent magnet 23 is embedded in iron core 22. Therefore, electric motor 1 in the present exemplary embodiment is an IPM motor.

Rotary shaft 21 has shaft center C that is a center of rotation of rotor 20. Rotary shaft 21 extends in the direction of shaft center C. Rotary shaft 21 is an elongated shaft, and is, for example, a metal rod. Rotary shaft 21 is fixed to iron core 22. Specifically, rotary shaft 21 is inserted into a through-hole provided at the center of iron core 22 and fixed to iron core 22 while extending on opposite sides of iron core 22 in the direction of shaft center C. Rotary shaft 21 is fixed to iron core 22 by press-fitting or shrink-fitting into the through-hole of iron core 22, for example.

First portion 21a, which is one portion of rotary shaft 21 protruding to one side of iron core 22, is supported by first bearing 41. On the other hand, second portion 21b, which is the other portion of rotary shaft 21 protruding to the other side of iron core 22, is supported by second bearing 42. That is, first bearing 41 and second bearing 42 rotatably support rotary shaft 21 is a pair of bearings. As described above, rotary shaft 21 is held by first bearing 41 and second bearing 42 in a rotatable state. As a result, rotor 20 is rotatable with respect to stator 10.

First bearing 41 and second bearing 42 are bearings. As an example, first bearing 41 and second bearing 42 are ball bearings, but may be other bearings such as thrust bearings.

In the present exemplary embodiment, an end of first portion 21a of rotary shaft 21 is an output-side end, and protrudes from first bracket 61 and first bearing 41. That is, first portion 21a of rotary shaft 21 is an output shaft, and a load such as a rotating fan is attached to the end of first portion 21a, for example. Note that, an end of rotary shaft 21 on second portion 21b side is an end on an opposite output shaft side, and does not protrude from second bracket 62 and second bearing 42. Second portion 21b of rotary shaft 21 is an opposite output shaft.

Iron core 22 of rotor 20 is disposed with an air gap interposed between the iron core of the rotor and iron core 11 of stator 10. Iron core 22 is a rotor iron core (rotor core) serving as a core of rotor 20. Iron core 22 is a stacked body in which a plurality of steel sheets are stacked in the direction of shaft center C of rotary shaft 21. Each of the multiple steel sheets is a punched electromagnetic steel sheet formed in a predetermined shape, for example. The multiple steel sheets are fixed to each other by crimping, for example. Note that, iron core 22 is not limited to the stacked body of the multiple steel sheets, and may be a bulk body made of a magnetic material.

Iron core 22 has a plurality of magnet insertion holes 22a. Each of the plurality of magnet insertion holes 22a serves as magnet embedded holes in which permanent magnets 23 are embedded. The plurality of magnet insertion holes 22a are formed in iron core 22 at equal intervals along the circumferential direction to surround rotary shaft 21. Each of the plurality of magnet insertion holes 22a extends in the direction of shaft center C of rotary shaft 21.

Permanent magnet 23 is disposed in each of the plurality of magnet insertion holes 22a. Specifically, one permanent magnet 23 is inserted into each magnet insertion hole 22a. Similarly to the plurality of magnet insertion holes 22a, the plurality of permanent magnets 23 are disposed at equal intervals along the circumferential direction to surround rotary shaft 21. Each permanent magnet 23 is a magnetized permanent magnet. The plurality of permanent magnets 23 are disposed such that an S-pole and an N-pole, which are each a magnetic pole, are alternately present in the circumferential direction of rotor 20. That is, two adjacent permanent magnets 23 are opposite in direction of magnetic poles of the S-pole and the N-pole.

In the present exemplary embodiment, since iron core 22 is provided with 10 magnet insertion holes 22a, 10 permanent magnets 23 are inserted into iron core 22. Therefore, the number of poles of rotor 20 is 10 (the number of pole pairs is 5). Note that permanent magnet 23 may be magnetized after permanent magnet 23 is disposed in magnet insertion hole 22a, or may be magnetized in advance before permanent magnet 23 is inserted into magnet insertion hole 22a. However, in consideration of workability of inserting permanent magnet 23 into magnet insertion hole 22a, it is preferable that the permanent magnet is magnetized after permanent magnet 23 is inserted into magnet insertion hole 22a.

Each permanent magnet 23 has a plate shape. Permanent magnet 23 is a rectangular parallelepiped having a plate shape, and has a rectangular shape in plan view. Therefore, a cross-sectional shape of permanent magnet 23 taken along a plane with shaft center of rotary shaft 21 as a perpendicular line is a rectangular shape. Permanent magnet 23 is disposed in magnet insertion hole 22a such that a thickness direction is the radial direction of iron core 22.

Each permanent magnet 23 is disposed in corresponding magnet insertion hole 22a to be close to an outside (outer periphery) of iron core 22 in the radial direction. Permanent magnet 23 inserted into magnet insertion hole 22a may be fixed to iron core 22 with an adhesive, or permanent magnet 23 may be fixed to iron core 22 by separately providing a fixing member having a projection that is filled in a gap between permanent magnet 23 and magnet insertion hole 22a.

Permanent magnet 23 is a rare earth magnet. For example, permanent magnet 23 is a neodymium rare earth magnet containing neodymium, iron, and boron (Nd—Fe—B) as a main component. Note that permanent magnet 23 is a sintered magnet, but may be a bonded magnet.

Permanent magnet 23 that is the rare earth magnet is a high-density magnet, and a residual magnetic flux density (Br) of permanent magnet 23 is greater than or equal to 1.3 T (tesler). The residual magnetic flux density of permanent magnet 23 is preferably greater than or equal to 1.33 T, more preferably greater than or equal to 1.4 T.

Note that, when electric motor 1 is used in a high-temperature atmosphere such as a compressor, a coercive force (Hcj) of the permanent magnet decreases as a temperature rises. Dysprosium (Dy) is added to permanent magnet 23 that is the rare earth magnet, and thus, the coercive force of permanent magnet 23 may be improved. However, when dysprosium is added to the rare earth magnet, the coercive force of the rare earth magnet is improved. On the contrary, the residual magnetic flux density (Br) of the rare earth magnet is reduced. Thus, in a case where dysprosium is added to permanent magnet 23, the addition amount of dysprosium is preferably small. In the present exemplary embodiment, permanent magnet 23 does not contain dysprosium.

As illustrated in FIG. 3, iron core 22 of rotor 20 has an outermost peripheral surface provided with recesses 22b formed such that a part between two adjacent permanent magnets 23 is recessed inward (that is, in a direction toward shaft center C). As a result, iron core 22 has a shape having bulging portions 22c that bulge outward at positions corresponding to the plurality of permanent magnets 23 at an outermost peripheral part as viewed from the direction of shaft center C of rotary shaft 21. That is, iron core 22 has such a shape that each bulging portion 22c becomes a petal as viewed from the direction of shaft center C of rotary shaft 21. In the present exemplary embodiment, since 10 permanent magnets 23 are provided in iron core 22, 10 recesses 22b are formed in the outermost peripheral part of iron core 22. Bulging portions 22c in which a portion corresponding to a magnetic pole center of each of 10 permanent magnets 23 bulges outward is formed at the outermost peripheral part of iron core 22. That is, rotor 20 is a petal rotor in which iron core 22 is formed to have 10 petals.

Figure 5:
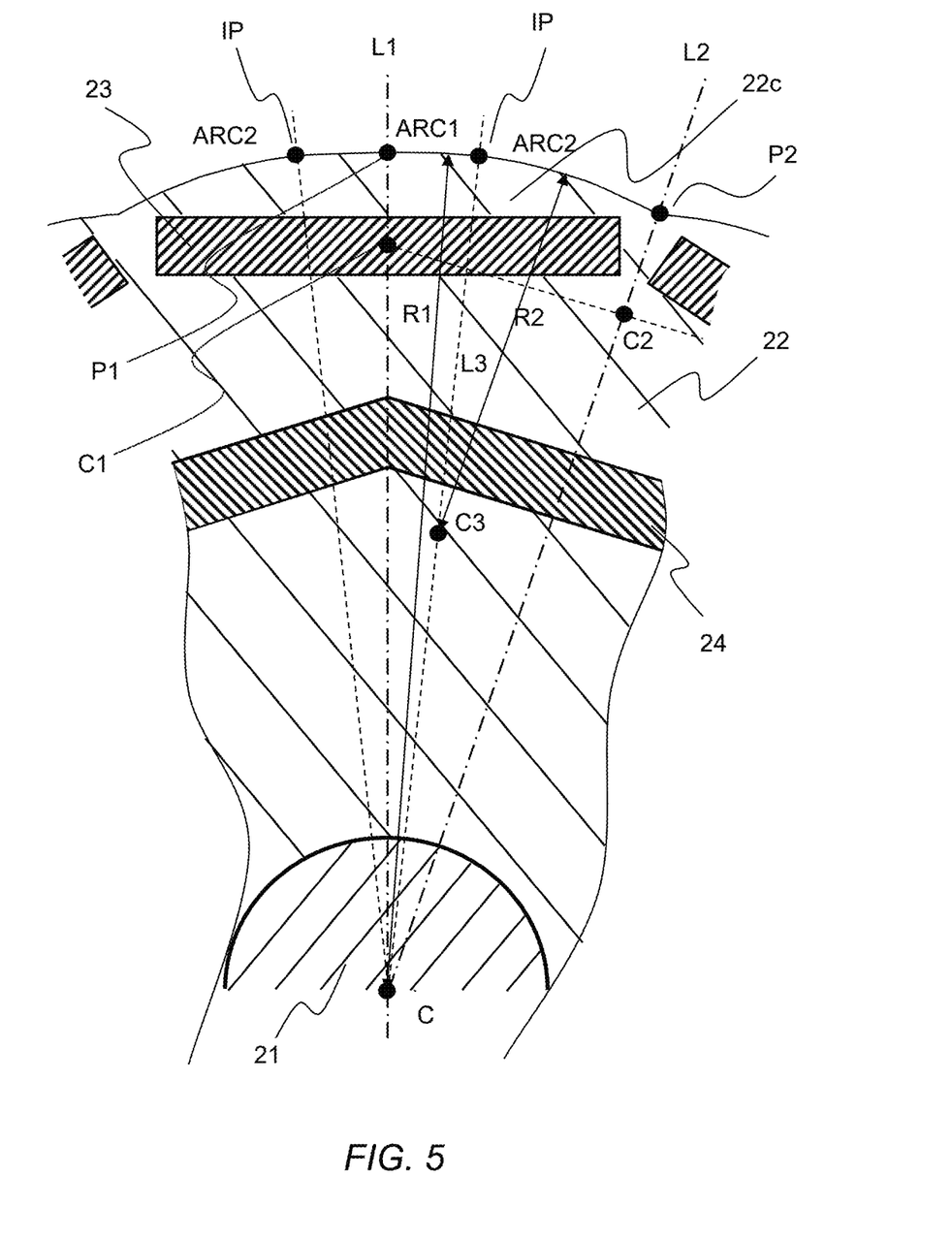
FIG. 5 is a diagram illustrating a shape of an iron core according to an exemplary example.

Specifically, on a plane intersecting shaft center C of rotary shaft 21, an outermost peripheral shape of iron core 22 corresponding to the magnetic pole of each of the plurality of permanent magnets 23 includes a plurality of arcs having different radii. That is, in bulging portion 22c (petal portion) corresponding to each permanent magnet 23, the outermost peripheral shape of iron core 22 includes a plurality of arcs having different radii. The outermost peripheral shape of iron core 22 in each bulging portion 22c includes a first arc ARC1 and a second arc ARC2 continuous via an inflection point, as shown in FIG. 5. The inflection point is a connection point (boundary point) between the first arc and the second arc, and the first arc and the second arc are one continuous curve via the inflection point IP.

The first arc ARC1 is an arc that passes through a first point P1 at which a first straight line L1 (that is, d-axis) passing through a center (C1) of the magnetic pole of permanent magnet 23 and shaft center C of rotary shaft 21 intersects an outermost periphery of iron core 22. Specifically, the first arc passes through the first point and connects two adjacent inflection points IP.

The second arc ARC2 is an arc that connects a second point P2 at which a second straight line L2 (that is, q-axis) passing through a center C2 between the magnetic poles of two adjacent permanent magnets 23 among the plurality of permanent magnets 23 and shaft center C of rotary shaft 21 intersects the outermost periphery of iron core 22 and an inflection point IP.

The outermost peripheral shape of iron core 22 in each bulging portion 22c is constituted by one first arc ARC1 and two second arcs ARC2. That is, the outermost peripheral shape of iron core 22 corresponding to one magnetic pole of each permanent magnet 23 is constituted by one first arc ARC1 and two second arcs ARC2. Specifically, the outermost peripheral shape of iron core 22 in each bulging portion 22c (one magnetic pole of each permanent magnet 23) has two inflection points IP, and one first arc ARC1 is sandwiched between two second arcs ARC2.

In the present exemplary embodiment, a center of the first arc ARC1 is shaft center C of rotary shaft 21. That is, when the first arc has a radius indicated as R1, the first arc is an arc with radius R1 about shaft center C as a rotation center. Therefore, the first arc ARC1 is a part of a circle forming a maximum diameter of iron core 22.

On the other hand, a center C3 of the second arc ARC2 has a center that is positioned between shaft center C and the outermost periphery (outer edge) of iron core 22 instead of being shaft center C of rotary shaft 21. The second arc ARC2 is an arc that forms recess 22b by recessing a part of the circle having the maximum diameter of iron core 22 toward shaft center C. That is, providing the second arc ARC2 enables a part of the outermost peripheral part of iron core 22 to be recessed.

In the present exemplary embodiment, the center C3 of the second arc ARC2 is a point positioned on a line segment L3 connecting an inflection point IP, which is a boundary point between the first arc and the second arc, and shaft center C of rotary shaft 21. That is, when the second arc has a radius indicated as R2, the second arc is an arc with radius R2 about this point as a rotation center.

As illustrated in FIGS. 1 and 3, dielectric material 24 is provided between rotary shaft 21 and the outer peripheral surface of iron core 22. As illustrated in FIG. 3, as viewed from the direction of shaft center C of rotary shaft 21, dielectric material 24 has an annular shape surrounding rotary shaft 21. Further, as illustrated in FIG. 1, dielectric material 24 extends in the direction of shaft center C of rotary shaft 21. Dielectric material 24 is made of an insulating material such as an insulating resin material. Therefore, dielectric material 24 insulates and separates iron core 22 from an outer iron core and an inner iron core in series with dielectric material 24 as a boundary. As a material of dielectric material 24, for example, a thermosetting resin such as an unsaturated polyester resin or an epoxy resin, a thermoplastic resin such as polybutylene terephthalate or polyamide, an elastic body such as an elastomer or vulcanized rubber, or the like can be used.

As described above, dielectric material 24 is provided in rotor 20. Thus, an electrostatic capacitance by dielectric material 24 is connected in series as an equivalent circuit on rotor 20 side, and an impedance on rotor 20 side can be increased. As a result, since a potential difference between an inner ring and an outer ring in first bearing 41 and second bearing 42, that is, an axial voltage can be reduced, the occurrence of electrolytic corrosion in first bearing 41 and second bearing 42 can be suppressed.

As illustrated in FIG. 3, dielectric material 24 has a polygonal annular shape around rotary shaft 21 as viewed from the direction of shaft center C of rotary shaft 21. As described above, dielectric material 24 is formed into a polygon, and thus, it is possible to prevent the inner iron core and the outer iron core in iron core 22 having dielectric material 24 as a boundary from idling due to the rotation of rotor 20.

In the present exemplary embodiment, since the number of corners and the number of sides of the polygon of dielectric material 24 are preferably the same as the number of permanent magnets 23, dielectric material 24 has an annular shape of a regular decagon. As described above, the number of corners of the polygon of dielectric material 24 is set to be equal to the number of magnetized poles of permanent magnet 23 held by rotor 20, and thus, it is possible to minimize imbalance caused by the rotation of rotor 20.

Vertices of the corners of the polygon of dielectric material 24 are positioned at the centers of the poles magnetized to permanent magnet 23 held by rotor 20 around rotary shaft 21. As a result, dielectric material 24 can be disposed without hindering a flow of the magnetic flux generated from permanent magnet 23. Further, the workability of iron core 22 can be improved by rounding (R) the vertices of the corners of the polygon of dielectric material 24.

As illustrated in FIG. 1, stator 10 is covered with molded resin 30. Molded resin 30 covers an outer portion of stator 10 over the entire circumference of stator 10 in the circumferential direction. Specifically, molded resin 30 covers outer portions of iron core 11, winding 12, and insulator 13. In the present exemplary embodiment, molded resin 30 is in contact with an outer surface of each of winding 12 and insulator 13.

Molded resin 30 is made of, for example, an insulating resin material having excellent thermal conductivity, such as a polyester resin or an epoxy resin. Further, molded resin 30 is made of a thermosetting resin. In the present exemplary embodiment, molded resin 30 is made of unsaturated polyester that is the thermosetting resin. Specifically, molded resin 30 is made of white bulk molding compound (BMC) unsaturated polyester resin.

Molded resin 30 constitutes an outer shell of electric motor 1, and an exposed surface is included in an outer surface of molded resin 30. Specifically, an outer peripheral surface serving as a side surface of molded resin 30 and an upper surface on first bracket 61 side are exposed. Further, molded resin 30 covering stator 10 constitutes a housing that encloses rotor 20. Note that a printed circuit board to which windings 12 of stator 10 are connected may be disposed in the housing.

As illustrated in FIGS. 1 and 2, molded resin 30 includes main body 31 constituting a body of electric motor 1, and protrusions 32 provided in main body 31. A plurality of protrusions 32 are provided in main body 31. Specifically, as illustrated in FIG. 2, four protrusions 32 are provided at equal intervals in the circumferential direction. Note that main body 31 and protrusions 32 are integrally formed by molding to form one molded resin 30.

As illustrated in FIG. 1, main body 31 covers stator 10. Specifically, main body 31 covers iron core 11, winding 12, and insulator 13.

Protrusions 32 protrudes outward in the radial direction. Specifically, protrusion 32 protrudes outward from a side surface of main body 31. Protrusion 32 is a leg portion of electric motor 1, and functions as an attachment portion for attaching electric motor 1 to an external device or the like. Protrusion 32 is provided with a through-hole through which a screw or the like is inserted.

As illustrated in FIG. 1, heat sink 50 is disposed on one side of molded resin 30 in the direction of shaft center C of rotary shaft 21. As illustrated in FIG. 2, heat sink 50 has a plurality of fins 51. Heat sink 50 is made of, for example, aluminum, but may be made of a metallic material other than aluminum.

First bracket 61 is fixed to one side of molded resin 30 in the direction of shaft center C of rotary shaft 21. Second bracket 62 is fixed to the other end of molded resin 30 in the direction of shaft center C of rotary shaft 21. First bracket 61 holds first bearing 41. First bearing 41 is fixed to a recess of first bracket 61. Second bracket 62 holds second bearing 42. Second bearing 42 is fixed to second bracket 62.

First bracket 61 and second bracket 62 are made of, for example, a metallic material such as iron. For example, first bracket 61 and second bracket 62 are made of a metal plate having a constant thickness. First bracket 61 and second bracket 62 are fixed to molded resin 30.

In electric motor 1 having the above configuration, when winding 12 of stator 10 is energized, a field current flows through winding 12 to generate a magnetic field. As a result, a magnetic flux oriented from stator 10 to rotor 20 is generated. Specifically, the magnetic flux is generated from each of teeth 11*b* of iron core 11 of stator 10 toward iron core 22 of rotor 20. On the other hand, rotor 20 generates a magnetic flux passing through stator 10 by permanent magnet 23 embedded in iron core 22. Interaction between the magnetic flux generated by stator 10 and the magnetic flux generated by permanent magnet 23 of rotor 20 generates a magnetic force to generate torque for rotating rotor 20, and rotor 20 rotates.

Electric motor 1 according to the present exemplary embodiment is used in, for example, an air conditioning unit such as an air conditioner. Specifically, electric motor 1 is mounted on a compressor of an outdoor unit of an air conditioning unit as a fan motor in which a rotary fan is attached to rotary shaft 21.

Next, operation and effects of electric motor 1 according to the present exemplary embodiment will be described including the background leading to the technology of the present disclosure.

In the related art, a technology using a rare earth magnet having a high energy density as a permanent magnet of an IPM motor has been known. As a result, the output and efficiency of the IPM motor can be improved.

On the other hand, since the IPM motor has magnetic attraction force that varies depending on a rotational position of the rotor due to the magnetic flux generated by the permanent magnet held in the iron core of the rotor, pulsation of torque called cogging torque is generated when the rotor rotates. Thus, when the IPM motor is used as the fan motor, vibration is generated by the cogging torque to generate noise, or the output and efficiency are reduced.

In this case, when the number of poles of the rotor is increased in order to suppress the cogging torque, a radio frequency component of a drive current of the IPM motor increases. For example, in the IPM motor using the rare earth magnet in the related art, when the number of poles of the rotor is set to be greater than or equal to 10, the radio frequency component greatly increases. Thus, in the IPM motor using the rare earth magnet in the related art, the number of poles of the rotor has to be limited to be less than or equal to 8. Thus, there is a limit in suppressing the vibration due to the cogging torque by increasing the number of poles of the rotor and suppressing the reduction in the output and efficiency.

Therefore, in order to increase the output and the efficiency, it is conceivable to use the rare earth magnet having the high residual magnetic flux density (Br), but when the rare earth magnet having the high residual magnetic flux density (for example, $Br \geq 1.3$ T) is used in the IPM motor, the vibration and noise increase. Thus, in the fan motor equipped with the IPM motor using the rare earth magnet in the related art, a rare earth magnet having a low residual magnetic flux density (for example, $Br < 1.3$ T) needs to be used.

As described above, in the IPM motor using the rare earth magnet in the related art, various factors are complicatedly involved, and it is difficult to achieve both suppression of the vibration and noise and high output and high efficiency.

Therefore, as a result of intensive studies on this problem, the inventors of the present application have arrived at the configuration of electric motor 1 that can achieve both the suppression of the vibration and noise and the high output and high efficiency even in the IPM motor using the rare earth magnet.

Specifically, in electric motor 1 according to the present exemplary embodiment, first, the rare earth magnet having the residual magnetic flux density of 1.3 T or more ($Br \geq 1.3$ T) is used as permanent magnet 23 disposed in magnet insertion hole 22*a* of iron core 22 of rotor 20. As a result, the output and efficiency of electric motor 1 can be improved.

On the other hand, when the rare earth magnet having the residual magnetic flux density of 1.3 T or more is used, the vibration and noise increase when electric motor 1 is used as the fan motor.

Therefore, in electric motor 1 according to the present exemplary embodiment, the number of poles of rotor 20 is set to be greater than or equal to 10. As a result, since the cogging torque can be suppressed, the vibration and noise due to the cogging torque can be suppressed. That is, the increase in the vibration and noise due to the use of the rare earth magnet having the residual magnetic flux density of 1.3 T or more as permanent magnet 23 can be offset by setting the number of poles of rotor 20 to be greater than or equal to 10.

Moreover, the number of poles of rotor 20 is set to be greater than or equal to 10, the output and efficiency can be improved. That is, the rare earth magnet having the residual magnetic flux density of 1.3 T or more is used as permanent magnet 23, and thus, the output and efficiency can be improved. In addition, the output and efficiency can be further improved.

On the other hand, when the number of poles of rotor 20 is set to be greater than or equal to 10, the radio frequency component of the drive current of electric motor 1 increases. Therefore, in electric motor 1 according to the present exemplary embodiment, the outermost peripheral shape of iron core 22 corresponding to the magnetic pole of each of the plurality of permanent magnets 23 includes a plurality of arcs having different radii. That is, iron core 22 has a plurality of bulging portions 22c as petals as viewed from the direction of shaft center C of rotary shaft 21.

With this configuration, since deviation of a magnetic flux density distribution from an ideal sinusoidal waveform can be reduced, an induced voltage radio frequency amplitude can be reduced in almost all the orders. Therefore, an increase in the radio frequency component due to the number of poles of rotor 20 being set to be greater than or equal to 10 can be offset by forming iron core 22 of rotor 20 in a petal shape.

As described above, according to electric motor 1 according to the present exemplary embodiment, it is possible to suppress the increase in the radio frequency component of the electric drive current while the high output and high efficiency is achieved even in the IPM motor using the rare earth magnet, and it is possible to suppress the cogging torque to suppress the vibration and noise. Therefore, even in the IPM motor using the rare earth magnet, it is possible to realize electric motor 1 capable of achieving both the suppression of the vibration and noise and the increase in the output and efficiency.

Further, in electric motor 1 according to the present exemplary embodiment, the residual magnetic flux density of permanent magnet 23 that is the rare earth magnet is preferably greater than or equal to 1.4 T.

As a result, it is possible to further increase the output and efficiency of electric motor 1 while maintaining the suppression of vibration and noise.

Further, in electric motor 1 according to the present exemplary embodiment, permanent magnet 23 that is the rare earth magnet does not contain dysprosium.

With this configuration, since the residual magnetic flux density of permanent magnet 23 can be improved as compared with the case where dysprosium is added to permanent magnet 23, the output and efficiency of electric motor 1 can be further improved. In addition, since dysprosium is expensive and difficult to obtain, dysprosium is not used, and thus, it is possible to easily manufacture electric motor 1 which can achieve both the suppression of the vibration and noise and the high output and high efficiency at low cost.

Further, electric motor 1 according to the present exemplary embodiment includes molded resin 30 that covers stator 10.

With this configuration, the vibration and noise can be further suppressed. Therefore, it is possible to realize electric motor 1 with high output and high efficiency with further low vibration and low noise.

In this case, molded resin 30 preferably has protrusion 32 protruding outward from the side surface of main body 31 covering stator 10.

With this configuration, since a natural frequency of electric motor 1 can be increased, the vibration and noise of electric motor 1 can be suppressed.

Further, in rotor 20 of electric motor 1 according to the present exemplary embodiment, dielectric material 24 is provided between rotary shaft 21 and the outer peripheral surface of iron core 22.

With this configuration, rotor 20 can have a double insulating structure to increase the impedance on rotor 20 side. As a result, since the potential difference (axial voltage) between the inner ring and the outer ring in first bearing 41 and second bearing 42 can be reduced, the occurrence of the electrolytic corrosion in first bearing 41 and second bearing 42 can be suppressed.

Figure 4A:
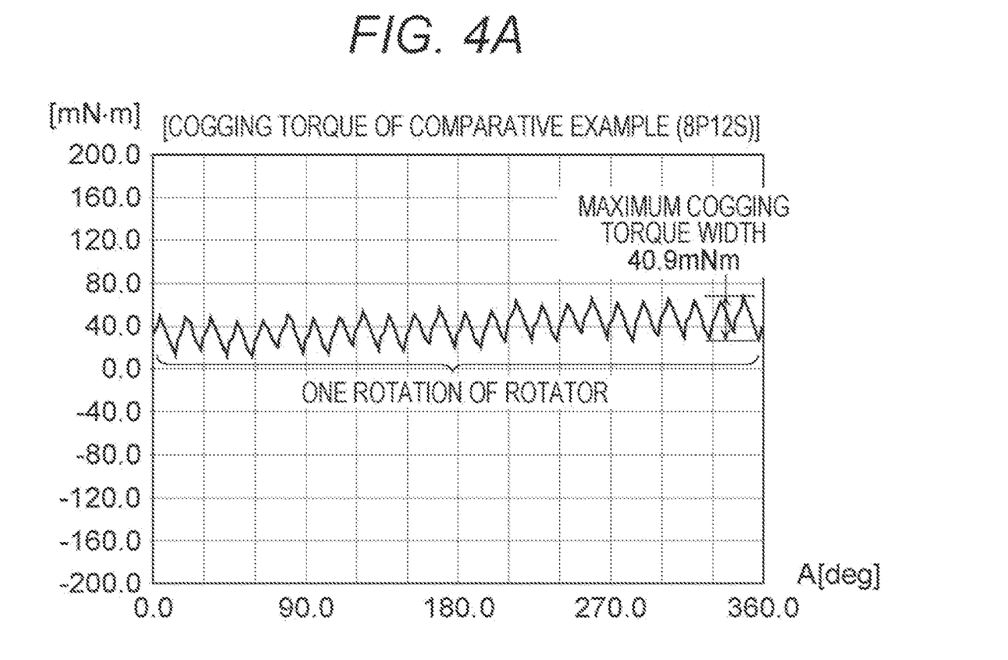
FIG. 4A is a diagram illustrating a relationship between a position angle of a rotor and torque in an electric motor according to a comparative example.
Figure 4B:
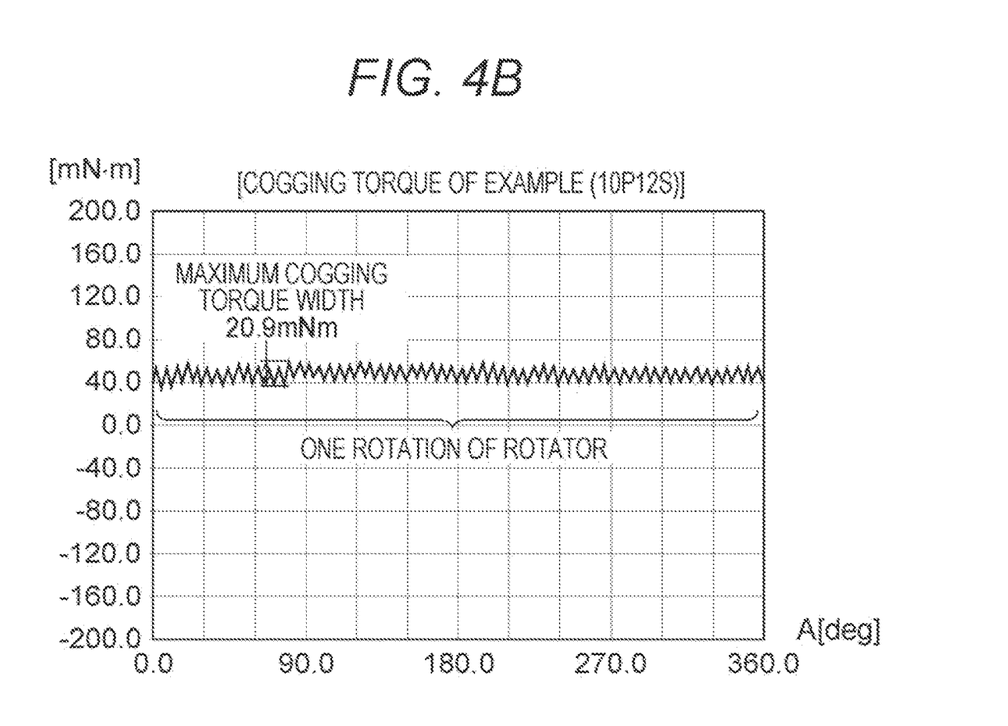
FIG. 4B is a diagram illustrating a relationship between a position angle of a rotor and torque in the electric motor according to the exemplary embodiment.

Here, since an experiment of actually measuring the cogging torque is performed for an electric motor of a comparative example and an electric motor of an example, measurement results will be described with reference to FIGS. 4A and 4B. FIG. 4A is a diagram illustrating a relationship between a position angle of a rotor and torque in the electric motor according to a comparative example. FIG. 4B is a diagram illustrating a relationship between a position angle of a rotor and torque in the electric motor according to the example. In FIGS. 4A and 4B, a horizontal axis represents mechanical angle A (deg) of the rotor, and a vertical axis represents torque (unit: mN·m).

In this experiment, electric motor 1 according to the present exemplary embodiment illustrated in FIGS. 1 to 3 was used as the electric motor of the example. Specifically, the electric motor of the example is a 10-pole and 12-slot (10P12S) IPM motor in which the number of poles of rotor 20 is 10 and the number of slots of stator 10 is 12. A neodymium rare earth magnet having a residual magnetic flux density (Br) of 1.41 T was used as permanent magnet 23. Note that, in the case of using the 10-pole and 12-slot IPM motor, the suppression of the cogging torque can be expected even though a neodymium rare earth magnet having a residual magnetic flux density of 1.5 T is used.

On the other hand, in electric motor 1 according to the present exemplary embodiment illustrated in FIGS. 1 to 3, an 8-pole and 12-slot (8P12S) IPM motor having a structure in which the number of poles of rotor 20 is changed to 8 was used as the electric motor of the comparative example. In the electric motor of the comparative example, a neodymium rare earth magnet having a residual magnetic flux density of 1.28 was used as permanent magnet 23. The electric motor of the comparative example and the electric motor of the example are the same except for the number of poles of rotor 20 and the residual magnetic flux density of permanent magnet 23.

Further, the torque of the electric motor was measured by rotating rotor 20 at an external rotation speed of 1 r/min. Results are shown in FIGS. 4A and 4B.

As illustrated in FIG. 4A, a maximum cogging torque width of the electric motor (8P12S) of the comparative example was 40.9 mN·m. On the other hand, as illustrated in FIG. 4B, a maximum cogging torque width of the electric motor (10P12S) according to the exemplary embodiment was 20.9 mN·m. As described above, it was confirmed that the electric motor of the example can greatly reduce the cogging torque as compared with the electric motor of the comparative example.

As described above, electric motor 1 according to the present exemplary embodiment includes rotor 20 having iron core 22 to which rotary shaft 21 extending in the shaft center direction is fixed, and stator 10 disposed to face rotor 20. Stator 10 has the plurality of teeth 11b extending toward rotor 20 and slots 14 positioned between adjacent teeth 11b among the plurality of teeth 11b. Iron core 22 has the plurality of magnet insertion holes 22a and the plurality of permanent magnets 23 disposed in the plurality of magnet insertion holes 22a. The plurality of permanent magnets 23 are the rare earth magnets, the outermost peripheral shape of iron core 22 corresponding to the magnetic pole of each of the plurality of permanent magnets 23 includes the plurality of arcs having different radii, the number of poles of rotor 20 is greater than or equal to 10, and the residual magnetic flux density of permanent magnet 23 is greater than or equal to 1.3 T.

As a result, in the IPM motor using the rare earth magnet, it is possible to achieve both the suppression of the vibration and noise and the high output and high efficiency.

Further, the number of poles of the rotor is preferably 10, and the number of slots 14 of stator 10 is preferably 12.

Further, the residual magnetic flux density of permanent magnet 23 is preferably greater than or equal to 1.4 T.

Further, molded resin 30 that covers stator 10 may be further provided.

Further, molded resin 30 may have main body 31 that covers stator 10 and protrusion 32 that protrudes outward from the side surface of main body 31.

Further, the rare earth magnet may not contain dysprosium.

Further, the bearing that rotatably supports rotary shaft 21 may be provided, and the dielectric material may be provided between rotary shaft 21 and the outer peripheral surface of the iron core.

Modification Example

While electric motor 1 according to the present disclosure has been described above based on the exemplary embodiment, the present disclosure is not limited to the above-described exemplary embodiment.

In the above-described exemplary embodiment, the number of poles of rotor 20 is 10 (that is, the number of permanent magnets 23 is 10), but the present disclosure is not limited thereto. Any number of poles of rotor 20 can be applied as long as the number of poles is greater than or equal to 10.

Further, although the number of slots of stator 10 is 12 in the above-described exemplary embodiment, the present disclosure is not limited thereto. Any number of slots of stator 10 can be applied.

Further, in the above-described exemplary embodiment, winding 12 of stator 10 is wound around iron core 11 by concentrated winding, but the present disclosure is not limited thereto. For example, winding 12 of stator 10 may be wound around iron core 11 by distributed winding.

Further, although electric motor 1 is described in the above-described exemplary embodiment when being applied to the fan motor of the air conditioning unit, the present disclosure is not limited thereto. For example, electric motor 1 in the above-described exemplary embodiment can be used in various electric devices such as household electric devices such as a cleaner and a refrigerator, or industrial electric devices such as an automobile device and a robot.

The present disclosure includes exemplary embodiments which those skilled in the art can obtain by adding various changes to the exemplary embodiment described above, as well as embodiments implemented by freely combining constitutional elements and functions described in the exemplary embodiment without deviating from the spirit of the present disclosure.

The electric motor according to the present disclosure can be widely used in devices including an electric motor in various fields including a fan motor used in an air conditioning unit or the like.

The invention claimed is:

1. An electric motor comprising:
a rotor that has an iron core to which a rotary shaft extending in a shaft center direction is fixed; and
a stator that is disposed to face the rotor, wherein
the stator includes a plurality of teeth extending to the rotor, and a slot positioned between adjacent teeth among the plurality of teeth,
the iron core includes a plurality of magnet insertion holes and a plurality of permanent magnets disposed in the plurality of magnet insertion holes, respectively,
the plurality of permanent magnets are rare earth magnets,
an outermost peripheral shape of the iron core corresponding to a magnetic pole of each of the plurality of permanent magnets consists of one first arc and two second arcs, the first arc and the second arcs having different radii, and the first arc and the two second arcs forming one continuous curve having two inflection points,
the first arc is an arc that passes through a first point at which a first straight line passing through a center of the magnetic pole of a corresponding one of the plurality of permanent magnets and a shaft center of rotary shaft intersects an outermost periphery of the iron core, the first arc being an arc having the shaft center as its center,
each of the second arcs is an arc that connects a second point at which a second straight line passing through a center between the magnetic poles of two adjacent permanent magnets among the plurality of permanent magnets and the shaft center of the rotary shaft intersects the outermost periphery of the iron core and one of the inflection points, a center of one of the second arcs being a point positioned on a line segment connecting the inflection point, which is a boundary point between the first arc and the second arcs, and the shaft center of the rotary shaft,
a number of poles of the rotor is greater than or equal to 10, and
a residual magnetic flux density of each of the plurality of permanent magnets is greater than or equal to 1.3T.

2. The electric motor according to claim 1, wherein the number of poles of the rotor is 10, and a number of slots of the stator is 12.

3. The electric motor according to claim 1, wherein the residual magnetic flux density of the each of the plurality of permanent magnets is greater than or equal to 1.4T.

4. The electric motor according to claim 1, further comprising a molded resin that covers the stator.

5. The electric motor according to claim 4, wherein the molded resin has a main body that covers the stator and a protrusion that protrudes outward from a side surface of the main body.

6. The electric motor according to claim 1, wherein dysprosium is not contained in the rare earth magnet.

7. The electric motor according to claim 1, further comprising a bearing that rotatably supports the rotary shaft, wherein a dielectric material is provided between the rotary shaft and an outer peripheral surface of the iron core.

8. The electric motor according to claim 1, wherein the first arc is a part of a circle forming a maximum diameter of the iron core.

* * * * *